United States Patent
Bankston et al.

(10) Patent No.: US 8,484,059 B2
(45) Date of Patent: Jul. 9, 2013

(54) METHODS, SYSTEMS, AND PRODUCTS FOR SURVEYING FACILITIES

(75) Inventors: Deborah F. Bankston, Smyrna, GA (US); M. W. Rick Vinson, Birmingham, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1391 days.

(21) Appl. No.: 11/901,607

(22) Filed: Sep. 17, 2007

(65) Prior Publication Data

US 2008/0091507 A1   Apr. 17, 2008

Related U.S. Application Data

(60) Provisional application No. 60/852,182, filed on Oct. 17, 2006.

(51) Int. Cl.
*G06Q 10/00* (2012.01)
(52) U.S. Cl.
USPC .......................................... 705/7.11
(58) Field of Classification Search
USPC ...... 705/7.21, 400, 7.13, 7.14, 7.11; 701/207, 701/208, 211; 235/379; 370/476; 379/9.03; 725/51
See application file for complete search history.

(56) References Cited

U.S. PATENT DOCUMENTS

| | | | |
|---|---|---|---|
| 5,687,212 A * | 11/1997 | Kinser et al. ................. | 379/9.03 |
| 5,790,634 A | 8/1998 | Kinser, Jr. | |
| 5,908,465 A | 6/1999 | Ito et al. | |
| 5,920,846 A | 7/1999 | Storch | |
| 5,953,485 A | 9/1999 | Abecassis | |
| 6,006,096 A | 12/1999 | Trompower | |
| 6,035,253 A | 3/2000 | Hayashi et al. | |
| 6,268,802 B1 | 7/2001 | Foladare et al. | |
| 6,282,493 B1 | 8/2001 | Kitagawa et al. | |
| 6,553,310 B1 | 4/2003 | Lopke | |
| 6,581,045 B1 * | 6/2003 | Watson ........................ | 705/400 |
| 6,668,227 B2 | 12/2003 | Hamada et al. | |
| 6,810,415 B2 | 10/2004 | Allen | |
| 6,934,628 B2 * | 8/2005 | Harada ........................ | 701/211 |
| 6,957,266 B2 | 10/2005 | Evans | |
| 7,107,150 B2 * | 9/2006 | Iwamura et al. .............. | 701/208 |
| 7,216,153 B2 * | 5/2007 | Allen et al. .................... | 709/218 |
| 7,239,964 B2 | 7/2007 | Takizawa | |
| 7,346,451 B2 | 3/2008 | Sakashita et al. | |
| 7,580,789 B2 | 8/2009 | Nomura | |
| 7,587,274 B2 * | 9/2009 | Kaldewey et al. ............. | 701/208 |
| 7,751,971 B2 * | 7/2010 | Chang et al. .................. | 701/207 |
| 7,773,095 B1 | 8/2010 | Badrak et al. | |

(Continued)

OTHER PUBLICATIONS

Kim Terry, GIS and Mass Notification: Changing the Face of Emergency Communications, May 23, 2005, 2005 ESRI International User Conference, p. 6.*

(Continued)

*Primary Examiner* — Johnna Loftis
(74) *Attorney, Agent, or Firm* — Scott P. Zimmerman, PLLC

(57) ABSTRACT

Methods, systems, and products are disclosed for surveying equipment, machinery, plants, and other facilities. Facilities data may be overlaid onto a map to generate a graphical mapping. When this graphical mapping is displayed, a selection may be received to create a survey of the facilities. Another selection of a facilities item needing repair may be received, and an action may be associated to the facilities item. An electronic survey file is created that describes the facilities item needing repair.

20 Claims, 22 Drawing Sheets

U.S. PATENT DOCUMENTS

| | | | |
|---|---|---|---|
| 7,788,189 | B2 | 8/2010 | Budike, Jr. |
| 7,869,944 | B2* | 1/2011 | Deaton et al. .................. 701/207 |
| 2002/0023109 | A1 | 2/2002 | Lederer et al. |
| 2002/0099742 | A1 | 7/2002 | Antley et al. |
| 2003/0195700 | A1 | 10/2003 | Hamada et al. |
| 2003/0197642 | A1 | 10/2003 | Smith |
| 2003/0202645 | A1 | 10/2003 | Naik et al. |
| 2003/0202767 | A1 | 10/2003 | Glynn |
| 2004/0031059 | A1* | 2/2004 | Bialk et al. ..................... 725/129 |
| 2004/0059539 | A1* | 3/2004 | Otsuki et al. ................... 702/150 |
| 2004/0107211 | A1 | 6/2004 | Kite et al. |
| 2004/0204843 | A1 | 10/2004 | Hayama et al. |
| 2004/0236620 | A1* | 11/2004 | Chauhan et al. .................. 705/9 |
| 2004/0243453 | A1 | 12/2004 | Call et al. |
| 2005/0021513 | A1 | 1/2005 | Vedula et al. |
| 2005/0125303 | A1* | 6/2005 | Thornton et al. ............... 705/26 |
| 2005/0259694 | A1 | 11/2005 | Garudadri et al. |
| 2005/0286509 | A1 | 12/2005 | Iwamura |
| 2006/0173953 | A1 | 8/2006 | Salzsauler |
| 2006/0256792 | A1 | 11/2006 | Kwong et al. |
| 2007/0016651 | A1 | 1/2007 | Blagsvedt et al. |
| 2007/0067103 | A1 | 3/2007 | Fukumoto et al. |
| 2007/0156661 | A1 | 7/2007 | Allen et al. |
| 2007/0228145 | A1* | 10/2007 | Diemer ......................... 235/379 |
| 2007/0250265 | A1 | 10/2007 | Mori |
| 2007/0282781 | A1 | 12/2007 | Mathiesen et al. |
| 2008/0069144 | A1* | 3/2008 | Yu et al. ......................... 370/476 |
| 2008/0162031 | A1 | 7/2008 | Okuyama et al. |
| 2008/0294496 | A1 | 11/2008 | Hall et al. |
| 2010/0010875 | A1 | 1/2010 | Armstrong et al. |
| 2010/0037264 | A1* | 2/2010 | Hardacker et al. .............. 725/51 |

OTHER PUBLICATIONS

Code of Federal Regulations, Title 47, Telecommunication Chapter I, FCC Subchapter B-Common Carrier Services, Part 64, Misc. Rules Relating to Common Carriers, pp. 1-16.

National Communications System, NCS Directive 2-1, Plans, Programs, and Fiscal Management, NSEP Telecommunications Planning Process, Sep. 30, 1998, pp. 1-19.

DHS: Homeland Security Deploys Massive Response and Recovery Effort for Isabel; https://www.dhs.gov/xnews/releases/press_release_0254.shtm; Sep. 19, 2003; p. 1.

DHS: Massive Homeland Security Response Ready to Meet Hurricane Victim Needs as Secretary Ridge Visits Impacted Areas; https://www.dhs.gov/xnews/releases/press_release_0257.sh.

Telecommunications Section; http://emd.wa.gov/1-dir/com/com-ids.htm; pp. 1-4.

Internet Security News: [ISN] IT Managers Brace for Isabel; InfoSec News; Sep. 18, 2003; pp. 1-3.

Streaming MultiMedia Data Team Solutions, www.teamsolutions.co.uk/streaming.html, Nov. 27, 2006.

C.F.R.; Title 47—Telecommunication Chapter I; Federal Communications Commission; Subchapter B—Common Carrier Services; Pt. 64; current through Nov. 6, 2001; pp. 1-16.

National Communications System; NCS Directives and Manuals; http://www.ncs.gov/directives.html; Dec. 7, 2006, p. 1.

Department of Homeland Security; Sector-Specific Plans to Protect Critical Infrastructure Announced; http://www.dhs.gov/index.shtm; pp. 1-2.

Poon et al., Successful Application of Genetic Algorithms to Network Design and Planning, Google 2000, pp. 32-41.

Asumu et al., Performance in planning—Smart Systems for the Access Network, Google 1998, pp. 138-151.

Ritchie et al., Immersive Virtual Reality as An Interactive Tool for cable Harness Design, Google 2002, pp. 1-6.

INOVA, TeleCAD-GIS, Google 2002, pp. 1-3.

Deshpande et al., Telecom GIS: An Integrated Approach, Google 2003, pp. 1-7.

Counts, The Impact of Geography on Network Engineering, Google 2005, pp. 1-16.

* cited by examiner

FIG. 16
Prior Art

Loop Makeup Detail

| Wire Center: | SMYRGAMA | Serving Terminal IPID: | 2005095 | | Span Correction: | 0 |
| | | Address: | R-2512 N ATLANTA RD | | Temperature: | 90 / 120 deg. Fahr. |
| | | Count: | 1413,951-975 | | | |

Main Loop

| IPID | Source IPID | Material Description | Count | FRC | Length | Gauge | Loading | Cumulative Length | Resistance 1.0K Hz |
|------|-------------|---------------------|-------|-----|--------|-------|---------|-------------------|--------------------|
| 143506 | Out Count | 40EP1-1900CF | 1413,1-1200 | 22C | | | | 0 | 0.00 |
| 2005068 | 143506 | BKTA-900 | 1413,801-1200 | 22C | 30 | 26 | BT1 | 30 | 2.78 |
| 2005070 | 2005068 | BKTA-900 | 1413,801-1200 | 22C | 130 | 26 | BT2 | 160 | 14.85 |
| 2005072 | 2005070 | BKTA-100 | 1413,951-1000 | 22C | 10 | 26 | | 170 | 15.78 |
| 143201 | 2005072 | BKTA-100 | 1413,951-1000 | 22C | 54 | 26 | | 224 | 20.79 |
| 143213 | 143201 | BKTA-100 | 1413,951-1000 | 22C | 315 | 26 | | 539 | 50.04 |
| 2005089 | 143213 | BH49-50 | 1413,951-1000 | 22C | 215 | 22 | | 754 | 57.89 |
| 2005092 | 2005089 | NC-25 | 1413,971-985 | 22C | | | | 754 | 57.89 |
| 2005094 | 2005089 | NC-25 | 1413,961-965 | 22C | | | | 754 | 57.89 |
| 2005095 | 2005089 | NC-25 | 1413,951-975 | 22C | | | | 754 | 57.89 |

Bridge Tap 1
Connects to Main Loop

| IPID | Source IPID | Material Description | Count | FRC | Length | Gauge | Loading | Cumulative Length | Cumulative Distance From CO |
|------|-------------|---------------------|-------|-----|--------|-------|---------|-------------------|------------------------------|
| 2005068 | 2005068 | BKTA-100 | 1413,901-1000 | 22C | 10 | 26 | | 10 | 40 |

METHODS, SYSTEMS, AND PRODUCTS FOR SURVEYING FACILITIES

CROSS REFERENCE TO RELATED APPLICATIONS

This application claims the benefit of U.S. Provisional Application No. 60/852,182, filed Oct. 17, 2006 and entitled "Mobile Mapping Tool", which is incorporated herein by reference in its entirety. This application also relates to the commonly assigned U.S. application Ser. No. 11/901,597, entitled "Methods, Systems, and Products For Mapping Facilities Data", now issued as U.S. Pat. No. 8,069,412, and incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

Exemplary embodiments generally relate to mapping of information and, more particularly, to mapping of facilities and equipment information for any industry.

Accurate and simple facilities information may be difficult to obtain. Many industries maintain diverse and/or remote plants, operations, and equipment. Significant efforts and financial investments are made to maintain accurate information on these facilities and equipment. Still, though, the information may be difficult to access and to interpret. Different facilities may utilize different communications networks and equipment, thus complicating efforts to unify all the facilities information. Moreover, the volume of facilities and equipment information may be too difficult to access and effectively utilize. When personnel cannot obtain accurate facilities information, repair efforts may be delayed.

In the communications industry, for example, there may be millions of different circuits. These circuits route calls and other Internet traffic throughout a city, state, and even the nation. When a circuit fails, or becomes congested, communications data must be rerouted to alternate circuits. Accurate and readily accessible information, then, must be maintained for all these circuit facilities. Sometimes, however, facility information is stored in a database that is unavailable or incompatible. When communications personnel have trouble accessing or sharing information, coordination of repair efforts is hampered and/or delayed. Whatever the industry, then, personnel must be able to quickly and easily obtain facilities and equipment information.

SUMMARY

Exemplary embodiments provide methods, systems, and products for surveying equipment, machinery, plants, and other facilities. The term "facilities" describes equipment, components, physical plants, and structures for any industry. Facilities data, describing the facilities, may be overlaid onto a map of roads to generate a graphical mapping. When this graphical mapping is displayed, a selection may be received to create a survey of the facilities. This survey may describe any facilities that need maintenance or repair, for any reason. Another selection of a facilities item needing repair may be received, and an action may be associated to the facilities item. An electronic survey file is created that describes the facilities item needing repair.

More exemplary embodiments include a system for surveying facilities. The system includes means for generating a graphical mapping of facilities data overlaid onto a map of roads. The system also includes means for receiving a selection to create a survey of the facilities. This survey may describe any facilities that need maintenance or repair, for any reason. Another selection of a facilities item needing repair may be received, and an action may be associated to the facilities item. An electronic survey file is created that describes the facilities item needing repair.

Still more exemplary embodiments include a computer program product for surveying facilities. The computer program product includes processor-executable instructions for generating a graphical mapping of facilities data overlaid onto a map of roads. When this graphical mapping is displayed, a selection may be received to create a survey of the facilities. This survey may describe any facilities that need maintenance or repair, for any reason. Another selection of a facilities item needing repair may be received, and an action may be associated to the facilities item. An electronic survey file is created that describes the facilities item needing repair.

Other systems, methods, and/or computer program products according to exemplary embodiments will be, or will become, apparent to one with ordinary skill in the art upon review of the following drawings and detailed description. It is intended that all such additional systems, methods, and/or computer program products be included within this description, be within the scope of the claims, and be protected by the accompanying claims.

DESCRIPTION OF THE DRAWINGS

These and other features, aspects, and advantages of the exemplary embodiments are better understood when the following Detailed Description is read with reference to the accompanying drawings, wherein:

FIGS. 13-17 are screenshots illustrating loop make-up features, according to exemplary embodiments;

FIGS. 18-20 are screenshots illustrating capabilities for generating a geographic-specific bill of materials, according to more exemplary embodiments;

DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
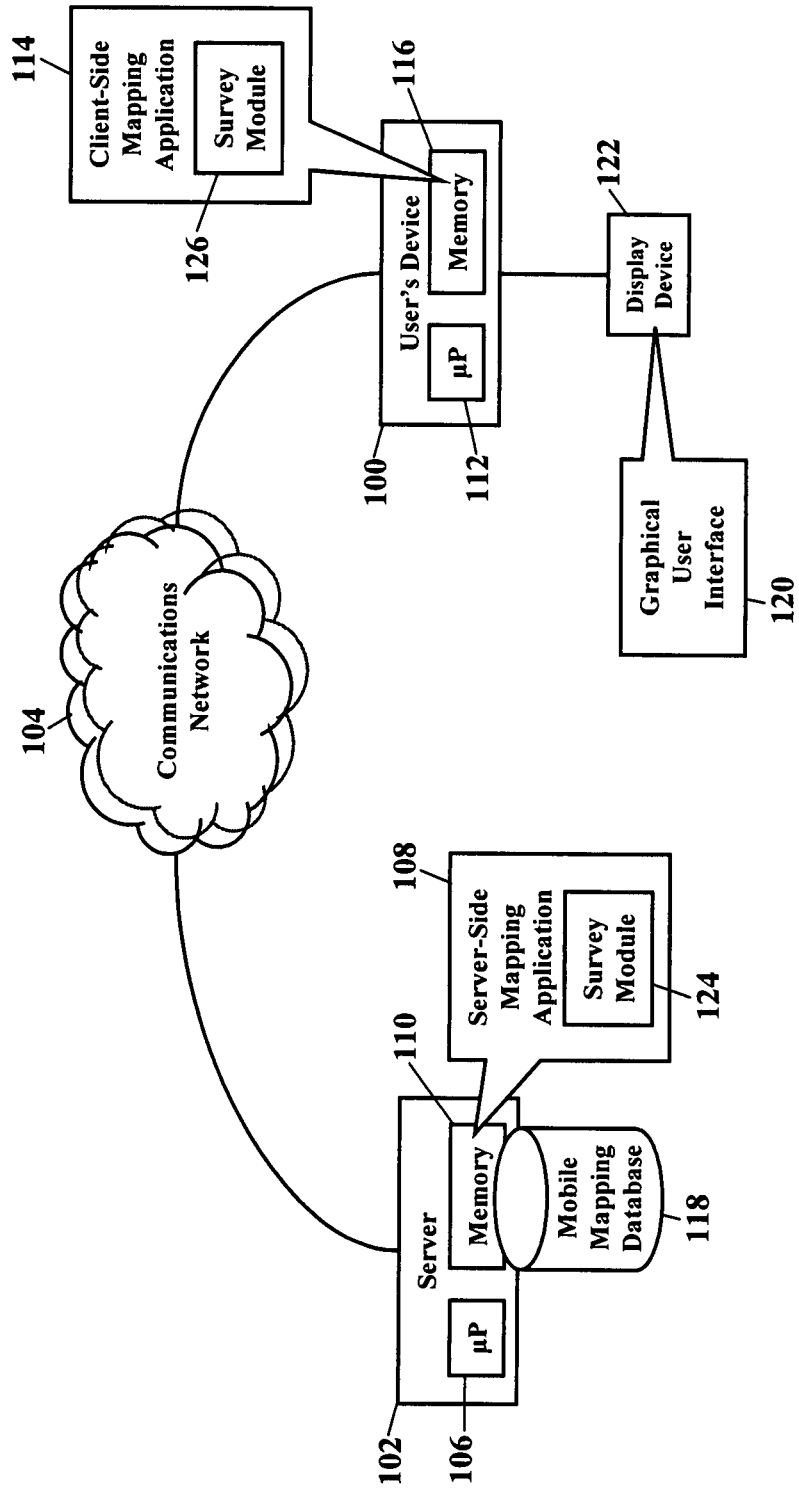
FIG. 1 is a simplified schematic illustrating an operating environment, according to exemplary embodiments.

FIG. 1 is a simplified schematic illustrating an operating environment, according to exemplary embodiments. A user's device 100 communicates with a server 102 via a communications network 104. Although the user's device 100 is generically shown, the device 100, as will be later explained, may be a computer, a radio, a personal digital assistant (PDA), a cordless/cellular/IP phone, digital music player, or any other device. The server 102 has a processor 106 (e.g., "µP"), application specific integrated circuit (ASIC), or other device that executes a server-side mapping application 108 stored in memory 110, according to exemplary embodiments. The user's device 100 may also have a processor 112 (e.g., "µP"), application specific integrated circuit (ASIC), or other device that executes a client-side mapping application 114 stored in memory 116. The user's device 100 and/or the server 102 may also communicate with a mobile mapping database 118. The mobile mapping database 118 is illustrated as being locally stored in the memory 116 of the server 102, yet the mobile mapping database 118 may be remotely stored and accessed from any node or device in the communications network 104. The server-side mapping application 108 and/or the client-side mapping application 114 may cooperate to cause the user's device 100 to generate a graphical user interface 120. The graphical user interface 120 is illustrated as being visually produced on a display device 122, yet the graphical user interface 120 may also have audible features. As the following paragraphs will explain, the server-side mapping application 108 and/or the client-side mapping application 114 may be sets of processor-executable instructions that cooperate to cross-reference geographic mapping data with detailed facility data. The server-side mapping application 108 and the client-side mapping application 114 thus may operate in a client-server environment that supports object oriented technology, messaging, transactions, security, system management, and/or reporting. Exemplary embodiments, however, may be implemented in a client-based application, where all software and/or logic operate in a client device (e.g., the user's device 100).

Exemplary embodiments may include survey capabilities. These survey capabilities permit the user (at the user's device 100) to survey and/or to assess machinery, equipment, and other facilities. The server-side mapping application 108, for example, may include a server-side survey module 124. The client-side mapping application 114 may also include a client-side survey module 126. The server-side survey module 124 and the client-side survey module 126 may be sets of processor-executable instructions that cooperate to assess facilities that may need repair. Exemplary embodiments, for example, may be used to assess facilities needing routine maintenance due to normal wear and tear. Exemplary embodiments, however, may be used to assess facilities that have been damaged by accident, by sabotage, or by storms, weather events, and other acts by God.

Exemplary embodiments may optionally have a "stand alone" operation. FIG. 1 illustrates a networked operation in which the user's device 100 communicates with the server 102 to obtain real-time, or near real time, facilities data. Sometimes, however, a connection to the communications network 104 (and thus the server 102) is unavailable or is unwanted. Exemplary embodiments, then, permit the user to operate the client-side mapping application 114 (and/or the client-side survey module 126) using locally-stored facilities data. That is, the user's device 100 may locally store facilities data in the memory 116, thus allowing the user (at the user's device 100) to survey facilities without the need for a network connection.

Figure 2:
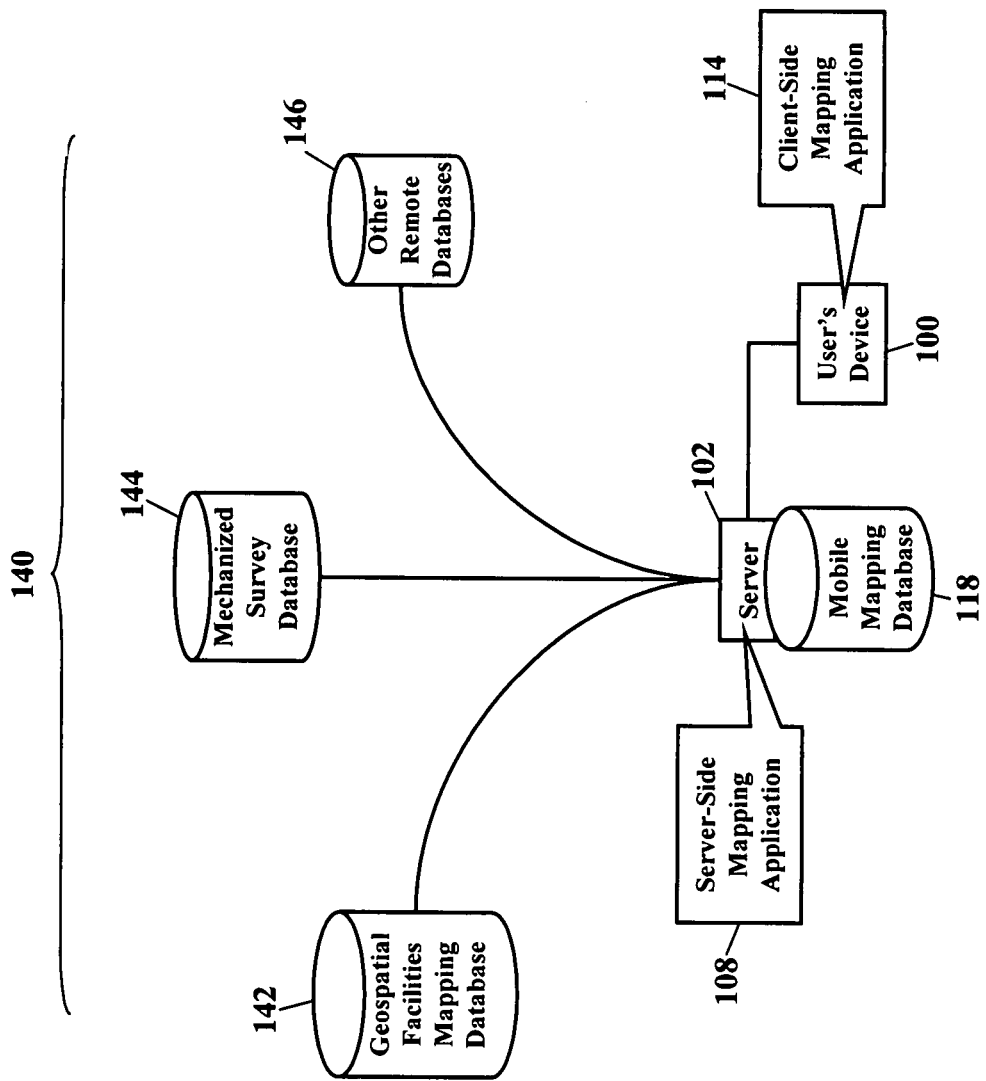
FIG. 2 is a schematic illustrating a more detailed operating environment, according to more exemplary embodiments.

FIG. 2 is a schematic illustrating a more detailed operating environment, according to more exemplary embodiments. Here the user (at the user's device 100) may interact with the client-side survey module 126 to access the server-side survey module 124 operating in the server 102. Before the user may access the survey capabilities, the user may first navigate through one or more login and/or authentication procedures (e.g., username and password) to limit access to authorized users. When the user is authenticated, the user may then be presented with a home page or welcome screen. As the following paragraphs will explain, the user may then interact with the client-side survey module 126 and/or the server-side survey module 124 to assess the facilities needed maintenance and repair.

As the user assesses the facilities, exemplary embodiments may interact with various databases 140. These databases 140 are queried to obtain information that is presented to the user at the user's device 100 (via the graphical user interface 120 and display device 122 illustrated in FIG. 1). A geospatial facilities mapping database 142, for example, may be accessed when plotting and/or editing data in mapping environments. The geospatial facilities mapping database 142, for example, may be a BENTLEY® POWERMAP® database (BENTLEY® and POWERMAP® are registered trademarks of Bentley Systems, Inc.). The geospatial facilities mapping database 142 may include a master database that captures a facilities snapshot of a selected geographic area. This geographic area, for example, may include information for a selected communications circuit as well as information for other circuits within a given or selected radius or distance). Exemplary embodiments, however, may utilize any source, vendor, or provider of geographic facilities and/or mapping data. A mechanized survey database 144 stores electronic data that facilitates selection and input of constraints, controls, and/or automation features to improve the accuracy or detail of the selected circuit and associated network components, according to exemplary embodiments. The server 102 may also interact with any other databases (such as a generically designated remote database 146). According to exemplary embodiments, these additional databases 140 allow the client-side survey module 126, the server-side survey module 124, and/or the mobile mapping database 118 to selectively access, manage, manipulate, and/or store detailed hardware and equipment information, facility location information, and mapping data. These additional databases 140 are illustrated as being remotely located from the server 102 and from the user's device 100, yet any of the additional databases 140 may be locally stored in the user's device 100 and/or the server 102. These additional databases 140 are also known to those of ordinary skill in the art and, thus, not described in detail.

The user's device 100 and the server 102 are only simply illustrated. Because the architecture and operating principles of the user's device 100 and the server 102 are well known, the hardware and software components of these devices are not further shown and described. If the reader desires more details, the reader is invited to consult the following sources: ANDREW TANENBAUM, COMPUTER NETWORKS (4$^{th}$ edition 2003); WILLIAM STALLINGS, COMPUTER ORGANIZATION AND ARCHITECTURE: DESIGNING FOR PERFORMANCE (7$^{th}$ Ed., 2005); and DAVID A. PATTERSON & JOHN L. HENNESSY, COMPUTER ORGANIZATION AND DESIGN: THE HARDWARE/SOFTWARE INTERFACE (3$^{rd}$. Edition 2004).

Exemplary embodiments may be applied regardless of networking environment. The communications network 104 may be a cable network operating in the radio-frequency domain and/or the Internet Protocol (IP) domain. The communications network 104, however, may also include a distributed computing network, such as the Internet (sometimes alternatively known as the "World Wide Web"), an intranet, a local-area network (LAN), and/or a wide-area network (WAN). The communications network 104 may include coaxial cables, copper wires, fiber optic lines, and/or hybrid-coaxial lines. The communications network 104 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

FIGS. 3-12 are schematics further illustrating the graphical user interface 120, according to more exemplary embodiments. As the above paragraphs explained, the client-side survey module 126 and/or the server-side survey module 124 queries the mobile mapping database 118 to obtain information. The client-side survey module 126 and/or the server-side survey module 124 may also query the additional databases 140 to obtain various other types of information. The client-side survey module 126 and/or the server-side survey module 124 then assemble, compile, and/or format all this information for visual and/or audible presentation at the user's device 100 (via the display device 122 illustrated in FIG. 1). The information, for example, is presented as the graphical user interface 120, and various versions of the graphical user interface 120 are illustrated in FIGS. 3-12. The graphical user interfaces 120 illustrated in FIGS. 3-12, however, are tailored to the communications industry. Exemplary embodiments, however, may be tailored to any industry or any service provider. That is, for example, exemplary embodiments may be adapted to survey and/or map facilities data with geographic mapping data for industrial facilities, private or public network facilities, water facilities, electric facilities, and road and highway departments. Exemplary embodiments, then, should not be limited to the communications industry.

Figure 3:
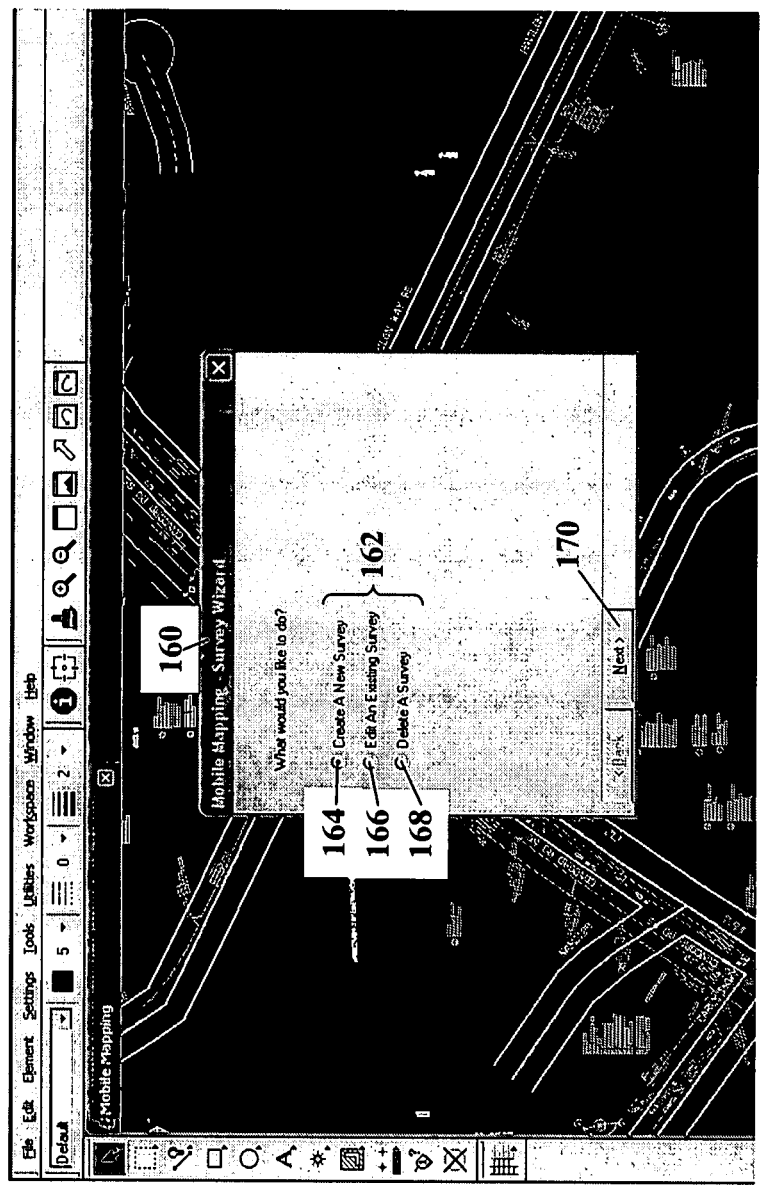
FIG. 3 is a screenshot of a graphical user interface for creating a facilities survey, according to exemplary embodiments.

FIG. 3, for example, is a screen shot of the graphical user interface 120, according to exemplary embodiments. Here the graphical user interface 120 may be produced by the client-side survey module 126 and/or the server-side survey module 124 (illustrated in FIG. 1). The graphical user interface 120, for example, may cause the display of a series of survey wizard dialog boxes 160. Each survey wizard dialog box 160 allows the user to survey and/or assess damaged or inoperative facilities. The survey wizard dialog box 160 may first allow the user to select and/or deselect survey options 162. The survey wizard dialog box 160, for example, presents a first option to create 164 a new survey, a second option to edit 166 an existing survey, or a third option to delete 168 a survey. FIG. 3 illustrates selection of the first option to create 164 a new survey, and the user then selects a "Next" control button 170.

Figure 4:
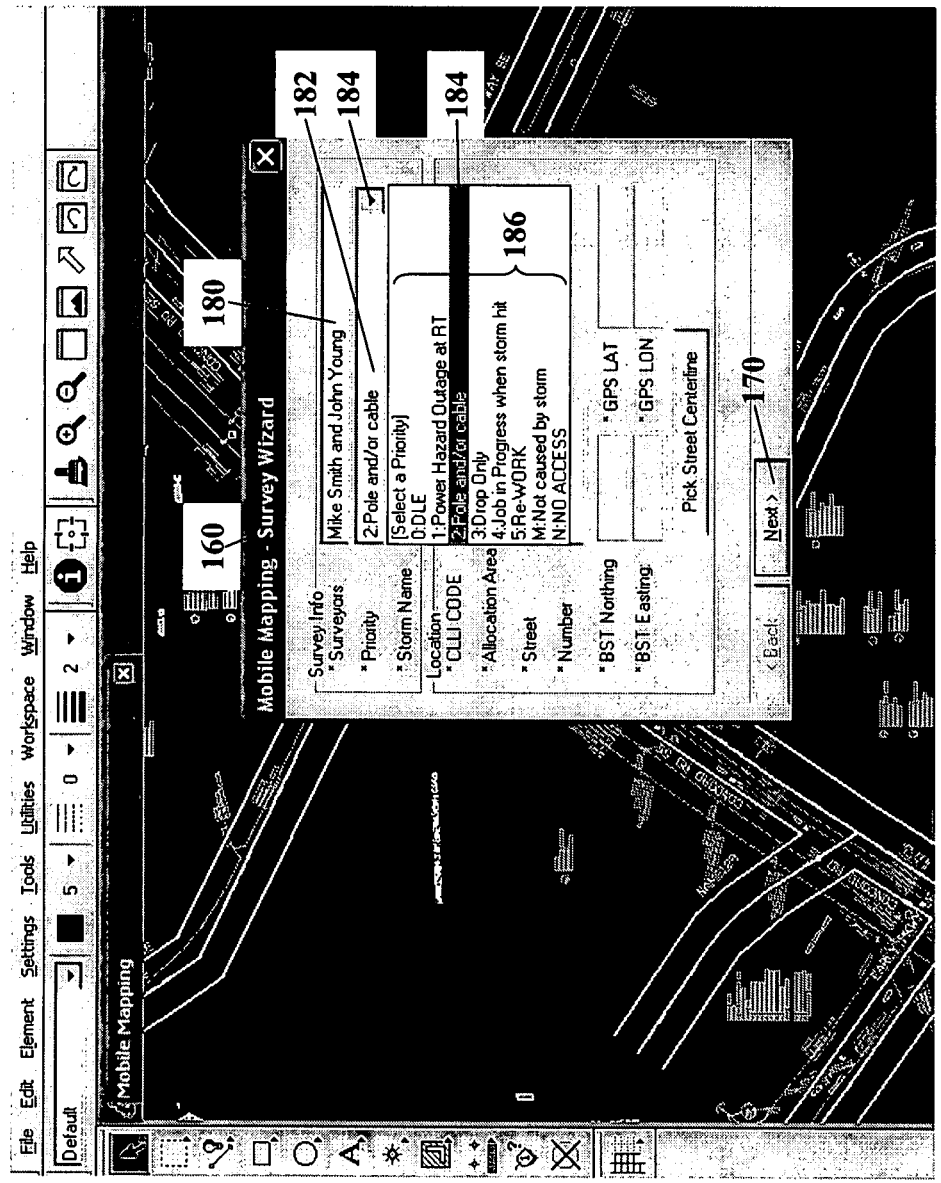
FIG. 4 is a screenshot of a survey wizard dialog box, according to more exemplary embodiments.

FIG. 4 is a screenshot of another survey wizard dialog box 160, according to exemplary embodiments. FIG. 4 illustrates different layers of data that may be displayed. Here, after the user selects the "Next" control button 170 (illustrated in FIG. 3), the user is presented with additional options for creating a new facilities survey. A surveyors data field 180, for example, allows the user to enter or type the name(s) of field personnel ("Mike Smith and John Young") who are performing the survey. A priority data field 182 allows the user to enter or type a priority for the facilities survey. Additionally or alternatively, the user may select a priority control 184 that, when selected, produces a drop down menu 186 for selecting priorities. In many industries, repair and/or recovery efforts may be prioritized. That is, some operations or equipment are higher priority and get repaired before lesser-priority operations. In the communications industry, for example, FIG. 3 illustrates various priorities for damaged facilities. Electrical power hazards are high priority repairs, while damaged poles and cables (e.g., a "pole and/or cable" option 188) may have a second priority. Whatever the industry, though, the drop down menu 186 allows the user to indicate or specify a priority category for the new survey.

Figure 5:
FIG. 5 is another screenshot of the survey wizard dialog box for associating information to the facilities survey, according to more exemplary embodiments.

FIG. 5 is another screenshot of the survey wizard dialog box 160, according to more exemplary embodiments. Here the user may enter, select, and/or otherwise associate additional information to the new survey. A storm name data field 200, for example, allows the user to select a name of a storm that may have caused damage to facilities. The client-side survey module 126 and/or the server-side survey module 124, for example, may have access to a storm name database (e.g., the generically designated remote database 146 illustrated in FIG. 2). This storm name database, for example, may be derived from, or obtained from, the World Meteorological Organization and/or the United States National Weather Service. A storm name control 202 allows the user to select the storm name from a drop down menu (not shown) of storm names. Because the World Meteorological Organization uses a new list of storm names for each calendar year, exemplary embodiments may automatically query for and obtain the latest listing for any past, current, or future year. The storm name data field 200, however, may be populated with any name or descriptor that the user chooses. The user, for example, may enter "January, 2007 ice storm," "April 23, 2007 wind event," or "March 3, 2007 heavy rains."

The survey wizard dialog box 160 may include location information. The location information is used to further identify and/or locate the facilities associated with the new survey. The location information may be any information that an industry uses to explain or describe a location. Some industries, for example, may use plant numbers, building and/or aisle numbers, equipment numbers, street addresses, mail codes, department numbers or codes, and/or GPS coordinates. In the communications industry, for example, the user may be prompted to enter a "CLLI" (Common Language Location Identifier) code 204, a plat number 206, an allocation area 208, a street name 210, and/or a number 212. Here, then, exemplary embodiments may allow the user to enter detailed information to precisely locate the new survey. Exemplary embodiments, alternatively, may include a "pick street centerline" control button 214 that, when selected, allows the user to select street centerlines (from a map or menu of streets, for example). As the user makes selections using the "pick street centerline" control button 214, exemplary embodiments may pre-populate any of the location data fields. Here, then, exemplary embodiments reduce human errors caused by, for example, an incorrect selection of a wire center or caused by incomplete location information. When or as the location information is selected, the survey wizard dialog box 160 may display or present corresponding latitude and longitude 216 information. Exemplary embodiments may then cause the graphical mapping to scroll to a location associated with the location information. The user then selects the "Next" control button 170.

Figure 6:
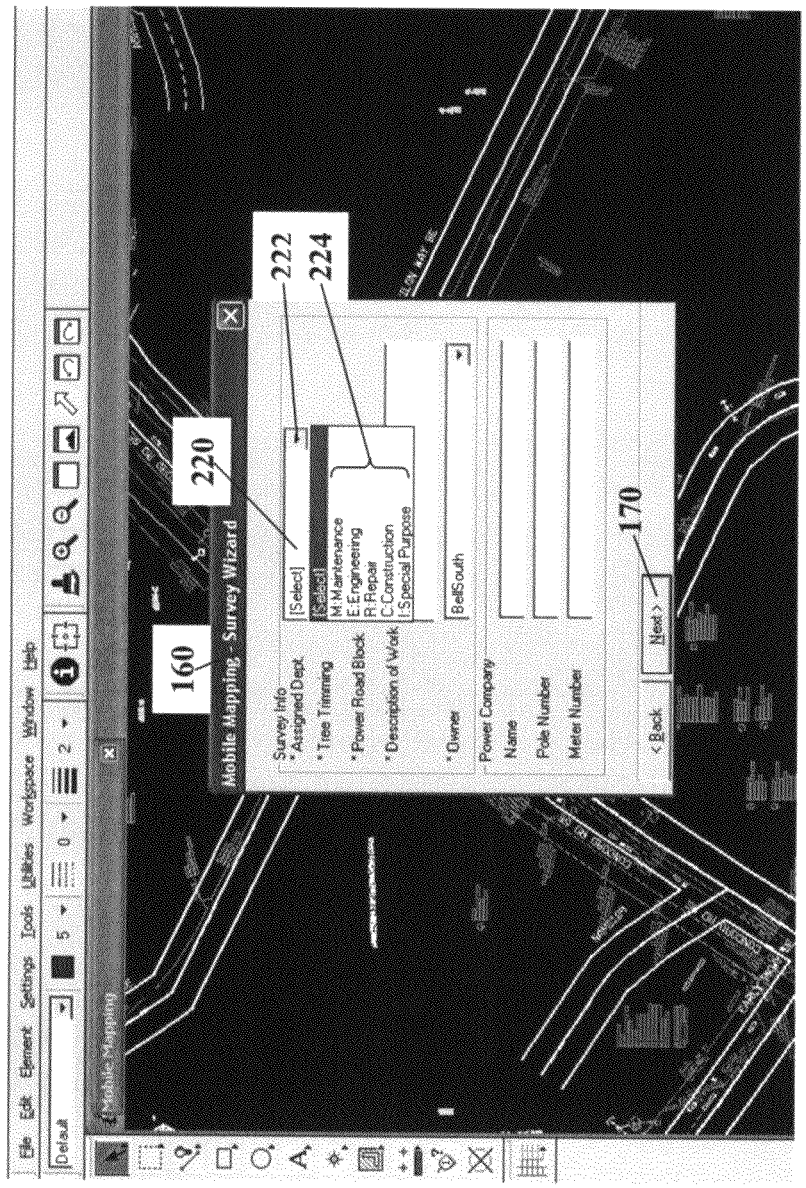
FIG. 6 is another screenshot of the survey wizard dialog box for assigning a repair, according to more exemplary embodiments.

FIG. 6 is another screenshot of the survey wizard dialog box 160, according to more exemplary embodiments. An assignment data field 220 allows the user to assign the repair/recovery work to a particular person, department, division, team, or any other industry designation. The user may type or enter data in the assignment data field 220, or the user may select an assignment control 222 that produces a drop down menu 224 of departments. The particular characteristics of the damaged facilities may determine which department (e.g., engineering or maintenance) is selected.

Figure 7:
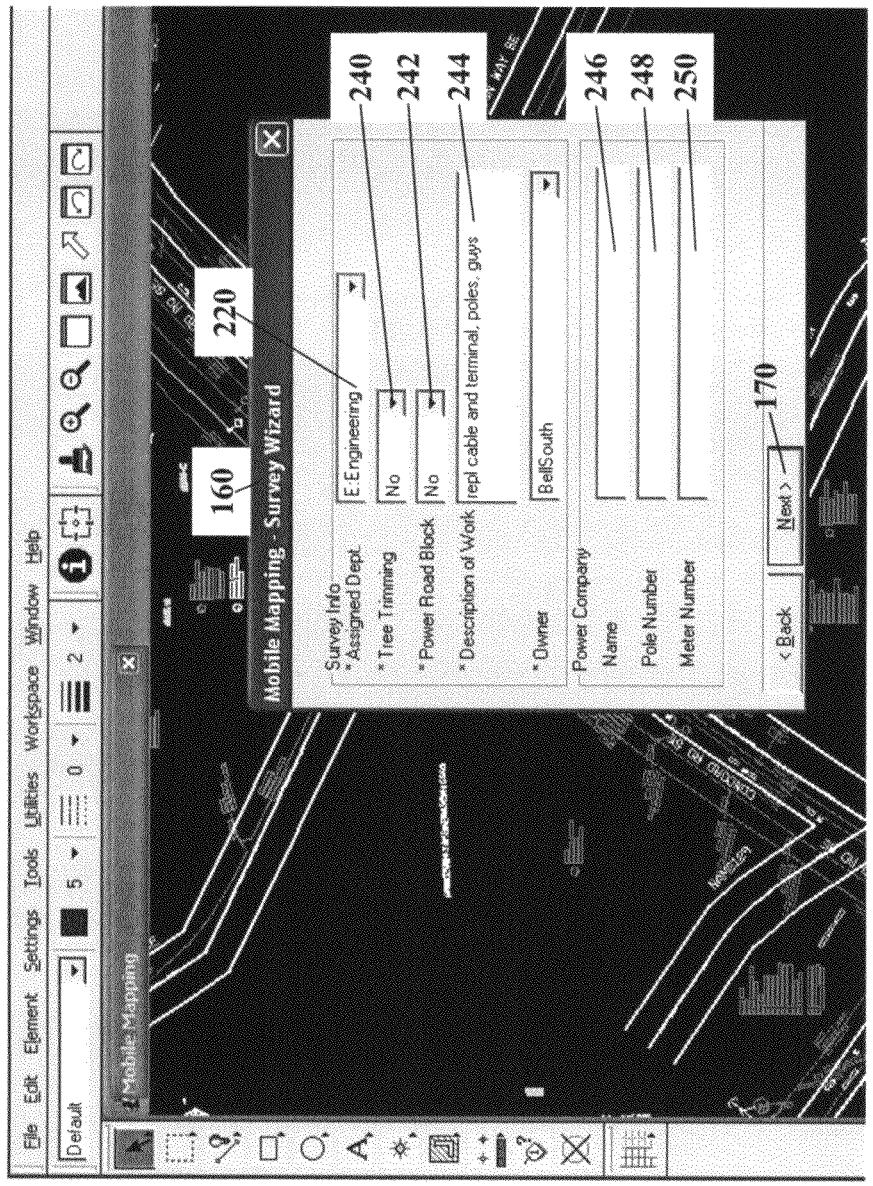
FIG. 7 illustrates more information that may be associated with the facilities survey, according to more exemplary embodiments.

FIG. 7 illustrates more information that may be associated with the new survey, according to more exemplary embodiments. A tree trimming option 240 allows the user to specify whether tree limbs must be trimmed or removed when repairing the facilities. A power road block option 242 allows the user to specify whether hazardous electrical conditions or lines must be repaired. Again, in many industries, specialized crews may be needed to facilitate repairs. Tree removal crews, for example, may be needed to remove fallen tree debris. In nearly all industries, cables, poles, buildings, windows, and equipment may be damaged by falling tree limbs. Similarly, electrical crews may be needed to clear/repair down electrical lines and/or to repair high voltage equipment. Exemplary embodiments may be modified to specify other specialized crews, such as plumbing crews, highway/street repair crews, heavy equipment repair crews, crane and other specialized moving crews, machinery repair crews, and any other repair crews having specialized training, procedures, and/or equipment. Exemplary embodiments, then, allow the user to specify when specially-trained personnel, or even sub-contractors, may need to be summoned. A description data field 244 allows the user to enter or type any information that further identifies the new survey or repair. If an electrical utility company is responsible for the tree trimming or electrical repair, the survey wizard dialog box 160 may include data fields for specifying a name 246 of the power company, an identifying pole number 248, and/or an identifying meter number 250. The user then selects the "Next" control button 170.

Figure 8:
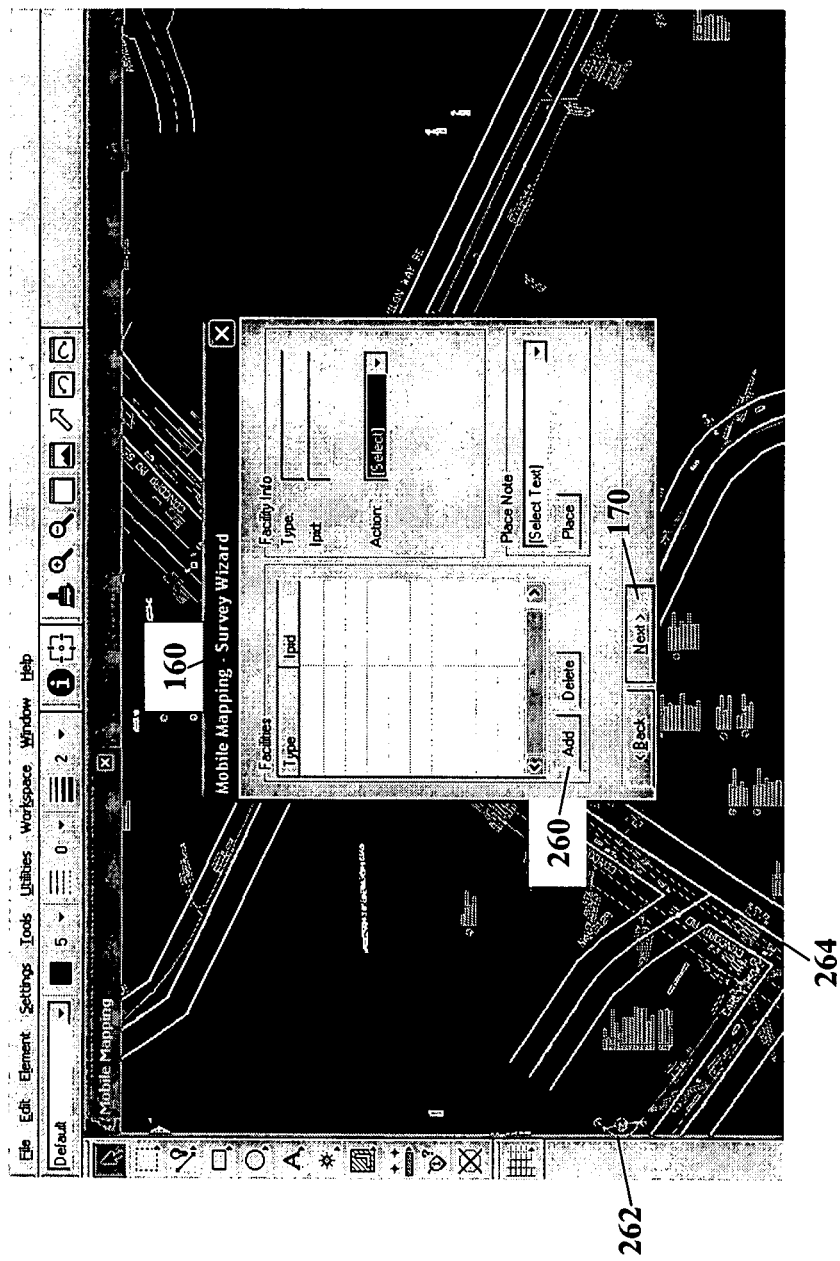
FIGS. 8-10 illustrate still more information that may be associated with the facilities survey, according to more exemplary embodiments.
Figure 9:
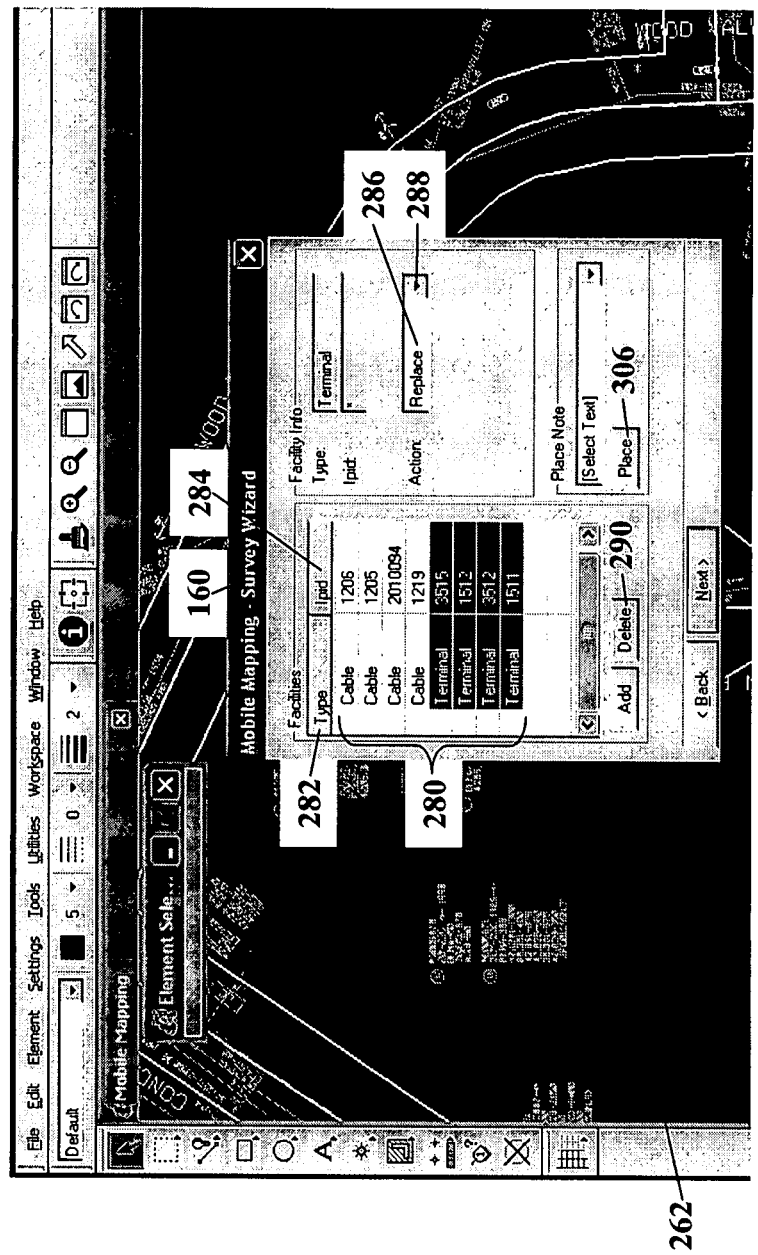
Figure 10:
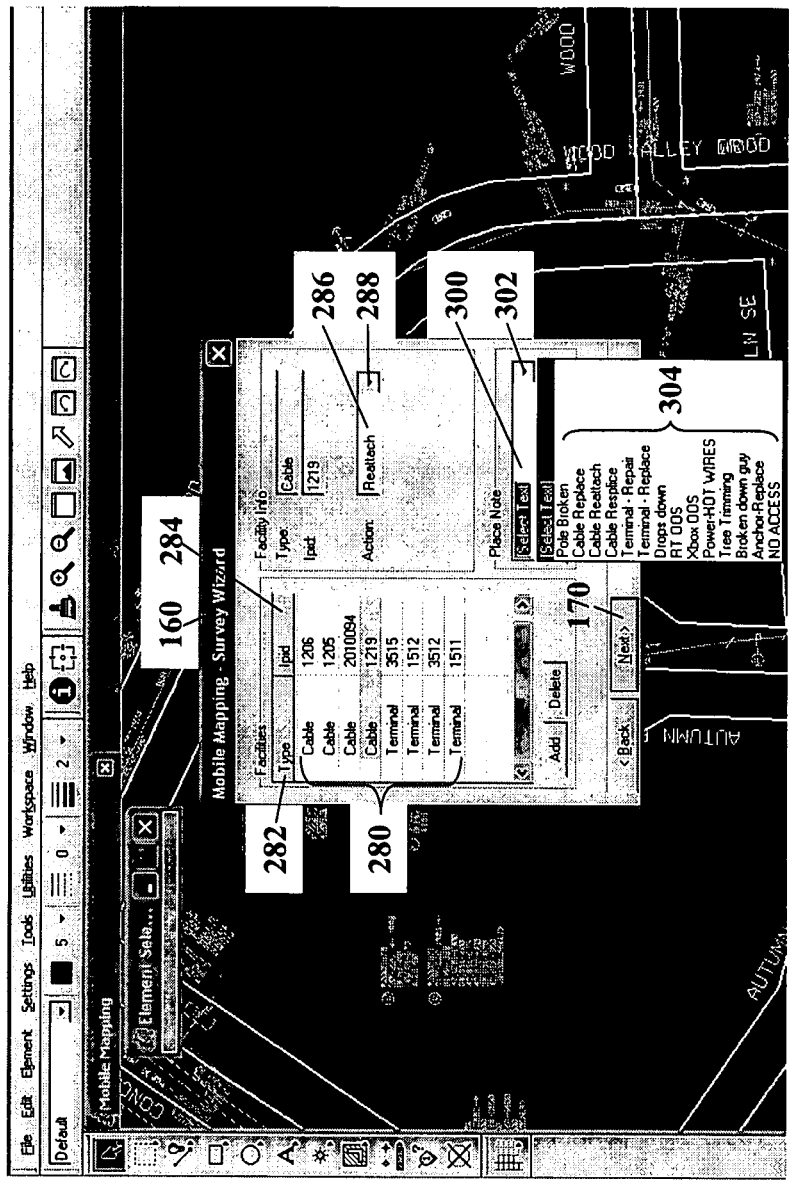

FIGS. 8-10 illustrate still more information that may be associated with the new survey, according to more exemplary embodiments. Here the survey crew may identify the specific facility equipment or items that need repair. As the field personnel perform the survey, the user visually inspects the facilities. When the user sees some facility item that needs attention or repair, the user moves a cursor (not shown) and "clicks" or otherwise selects an Add control button 260. According to exemplary embodiments, the survey wizard dialog box 160, upon selection of the Add control button 260, minimizes to fully reveal a detailed graphical mapping 262 of facilities. The graphical mapping 262 of facilities presents a map of some or all of the facilities associated with the chosen location information (as illustrated with reference to FIG. 5). In the communications industry, for example, exemplary embodiments map the wire center facilities associated with the location information (again, as illustrated in FIG. 5). The detailed graphical mapping 262 of facilities may be overlaid onto a map 264 of roads that corresponds to the location information. As the user performs the survey, the user visually inspects the facilities and merely "clicks" or selects the items produced on the graphical mapping 262 of facilities that may need inspection and/or repair.

FIG. 9, then, illustrates a listing 280 of items. As the user selects facility items needing attention, exemplary embodiment automatically store and track the user's selections. The survey wizard dialog box 160, then, visually produces the listing 280 of items. The listing 280 of items includes a type 282 of facility item needing repair and an "IPID" (Internet Protocol Identification) number 284 associated with each facility item. In the communications industry, the IPID number 284 uniquely identifies each facility item. Exemplary embodiments, however, may be adapted to display any identifying information associated with the facility item designated for repair.

The survey wizard dialog box 160 may also include an action data field 286. The action data field 286 explains what type of repair/recovery work is needed for each item in the listing 280 of items. That is, each facility item in the listing 280 of items corresponds to, or is associated with, its own action. A computerized machine may need to be reinitialized, a wear item may need replacement, a fluid reservoir may need refilling, or a water main may need sealing. Regardless, as the user selects the facility items that need attention, the user may also specify or select what repair action is needed. The user may type or enter the needed repair action into the action data field 286. The user, however, may also select an action control 288 that produces a drop down menu of repair actions (not shown for simplicity). In the communications industry, the repair action may correlate to the type 282 of facility item needing repair and/or to the IPID number 284. That is, the permissible repair action may be sensitive to the type of facility item being repaired. Some repair actions may not be selectable or be unavailable for some facility items. Should the user decide to remove an item from the listing 280 of items, the user may select, highlight, or emphasize the desired item and select a Delete control button 290.

FIG. 10 illustrates annotation of the repair efforts. When the user selects, highlights, or otherwise emphasizes an item in the listing 280 of items, the user may add notes describing the repair or damage. A place note data field 300 allows the user annotate any item in the listing 280 of items. A note control 302 may produce a pre-defined drop down menu 304 of annotations. The drop down menu 304 of annotations illustrated in FIG. 10 is tailored to the communications industry. The drop down menu 304 of annotations, then, lists pre-defined notes to explain why a communications facilities item needs repair or is out of service ("OOS"). Again, the drop down menu 304 of annotations may correlate to the action data field 286. That is, some notes in the drop down menu 304 of annotations may not be selectable or be otherwise unavailable for some repair actions. When the user selects a place control button 306 (illustrated in FIG. 9), the contents of the place note data field 300 are stored in an annotation file. The contents of the place note data field 300 may also be overlaid onto the detailed graphical mapping 262 of facilities. When repair personnel access the facilities survey, the same surveyor's annotations are presented. When the user has completed annotating the facilities items, the user then selects the "Next" control button 170.

Figure 11:
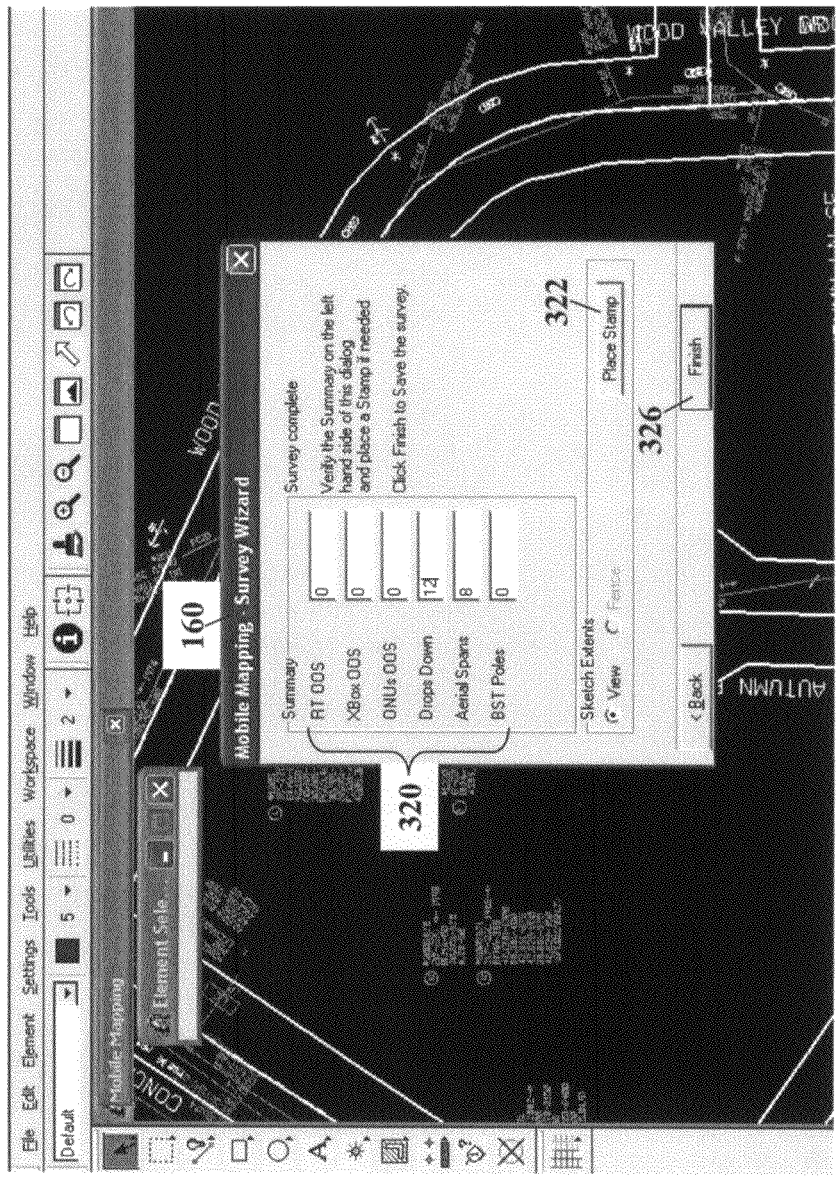
FIGS. 11-12 are screen shots that finalize the facilities survey, according to more exemplary embodiments.
Figure 12:
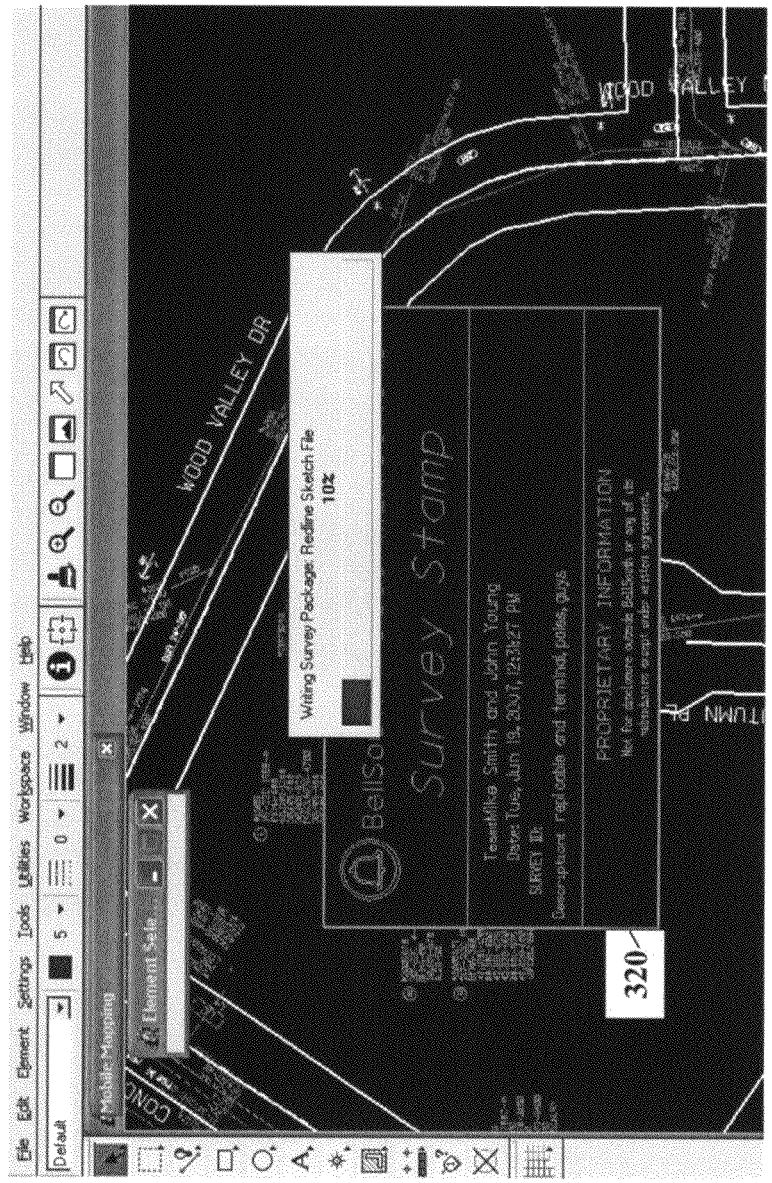

FIGS. 11-12 are screen shots that finalize the facilities survey, according to more exemplary embodiments. FIG. 11 is a screen shot of a summary of the survey. Here the survey wizard dialog box 160 presents a summary listing 320 of facilities items that need repair. Each category or type of facilities equipment is listed, and exemplary embodiments tally or sum the number of items in each category that need repair. A Place Stamp control button 322 allows the user to stamp the survey, as FIG. 12 then illustrates. A digital survey stamp 324 is overlaid or placed onto the digital facilities survey, and the survey stamp 324 may visually display a unique survey identification number that is assigned to the facilities survey. The survey stamp 324 is then included in a survey sketch that is electronically sent to repair and/or recovery crews. Once the survey stamp 324 is completed, the user then selects a Finish control button 326 (illustrated in FIG. 11). Exemplary embodiments then create an electronic survey package of files that is electronically transmitted to a central storage repository (not shown).

Figure 13:
Figure 14:
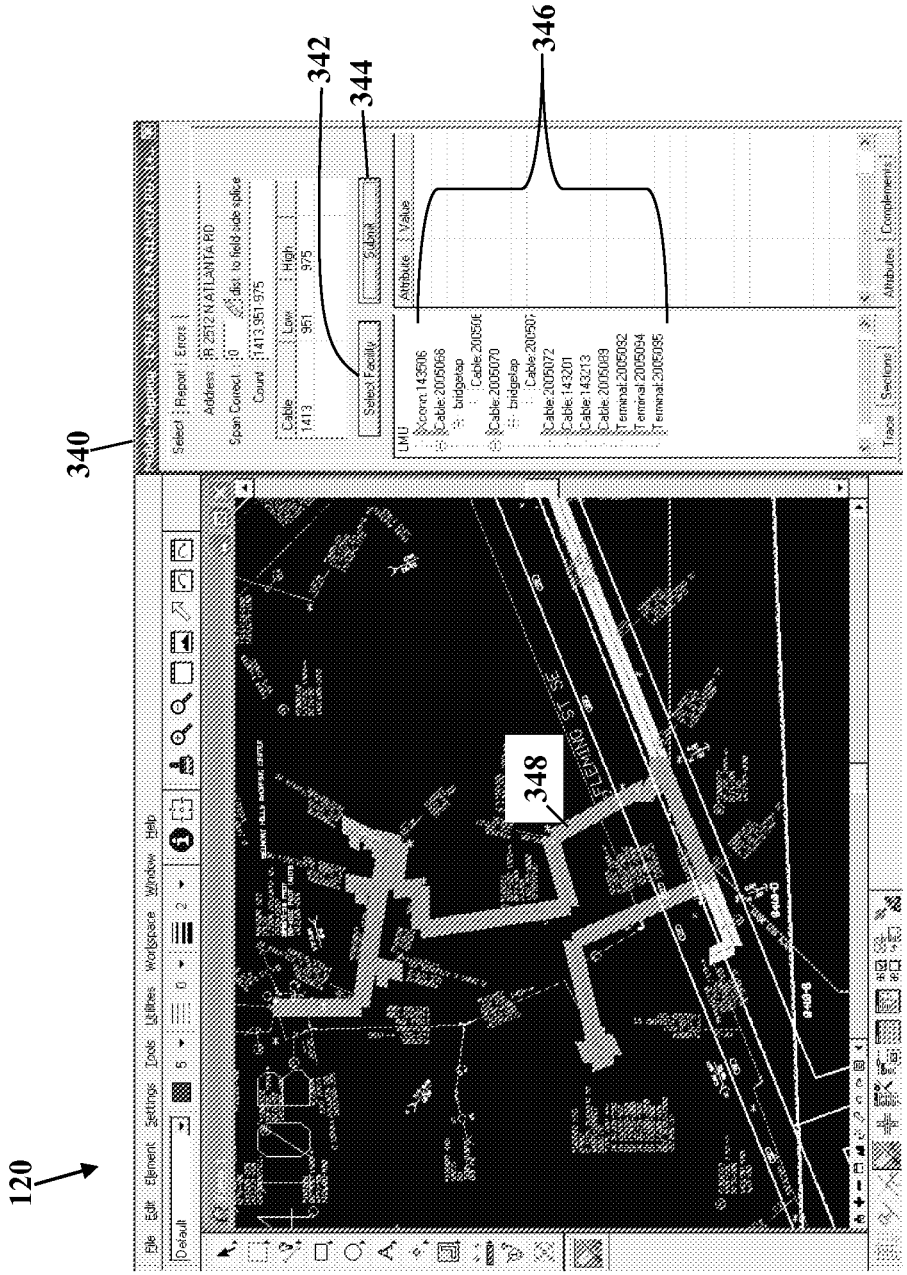
Figure 15:
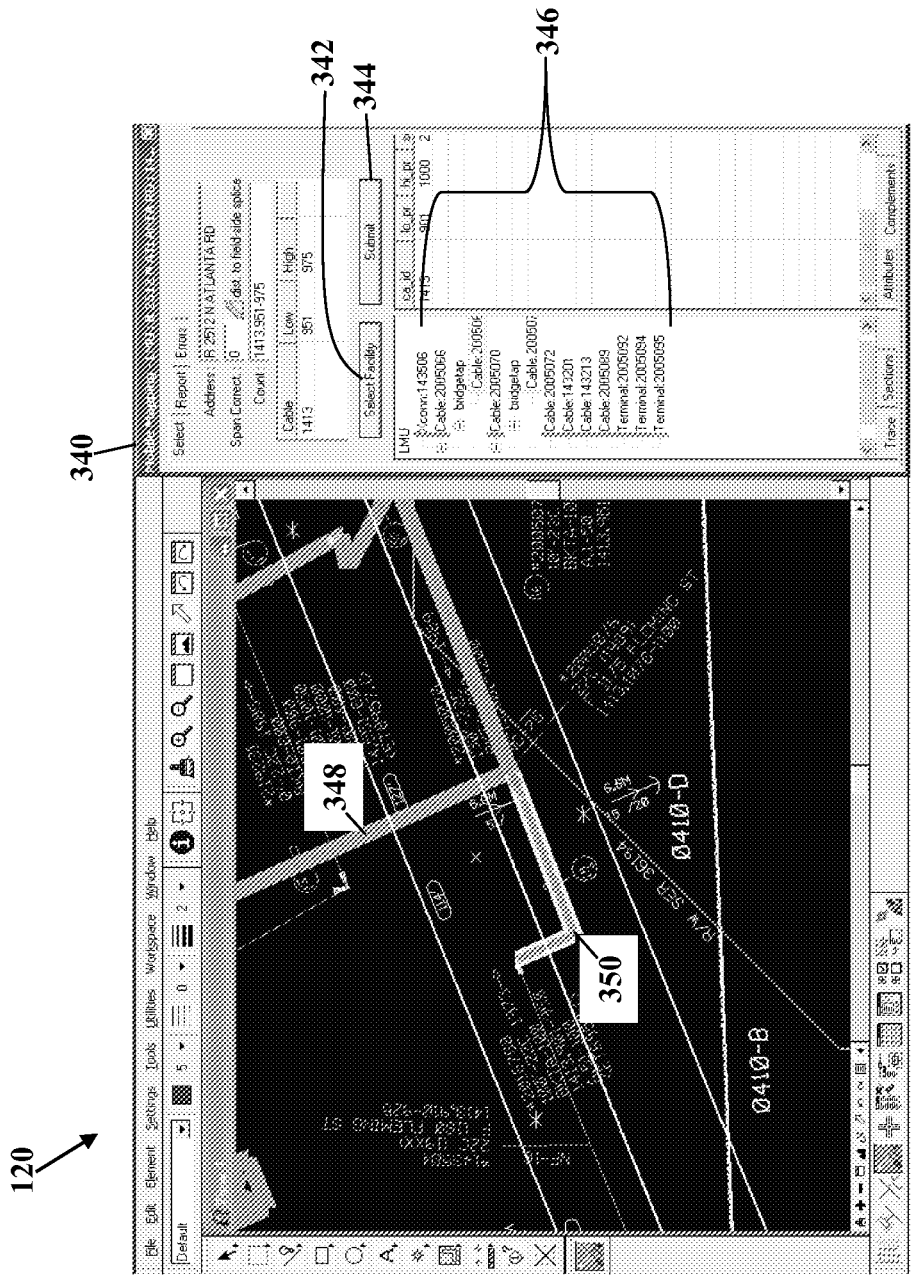

FIGS. 13-17 are screenshots illustrating loop make-up features, according to exemplary embodiments. Exemplary embodiments permit the user to query the source databases for loop make-up (or "LMU") information, even when disconnected from the communications network 104 (illustrated in FIG. 1). That is, the wire center data may be locally stored in the user device 100 (illustrated in FIG. 1) and, thus, accessed without a network connection. FIG. 13 illustrates an LMU dialog box 340. The user starts the loop make-up process by first pointing to, selecting, or otherwise highlighting an item of interest in the graphical user interface 120. The user then selects a "Select Facility" control button 342 and then selects a "Submit" control button 344 in the LMU dialog box 340. Exemplary embodiments then generate a loop make-up for the selected facility. FIG. 14 then illustrates a listing 346 of the loop make-up for the selected facility. The path 348 of the cable count is graphically presented (e.g., cable 1413 with counts 951-975), through multiple items. The path 348 may be emphasized (such as color coded or highlighted) for ease of reference. Color coding may additionally or alternatively designate one or more criteria of each item. For example, a requesting item may be highlighted in blue coloring, the main loop may be shown in green coloring, a bridge tap may have yellow coloring, and an end-section may have purple coloring. FIG. 15 illustrates that selecting or otherwise clicking on any candidate in the listing 346 of the loop make-up causes the graphical user interface 120 to zoom in or magnify to that item. The selected item may again be uniquely highlighted (illustrated by reference numeral 350) or color coded for ease of reference.

Figure 17:
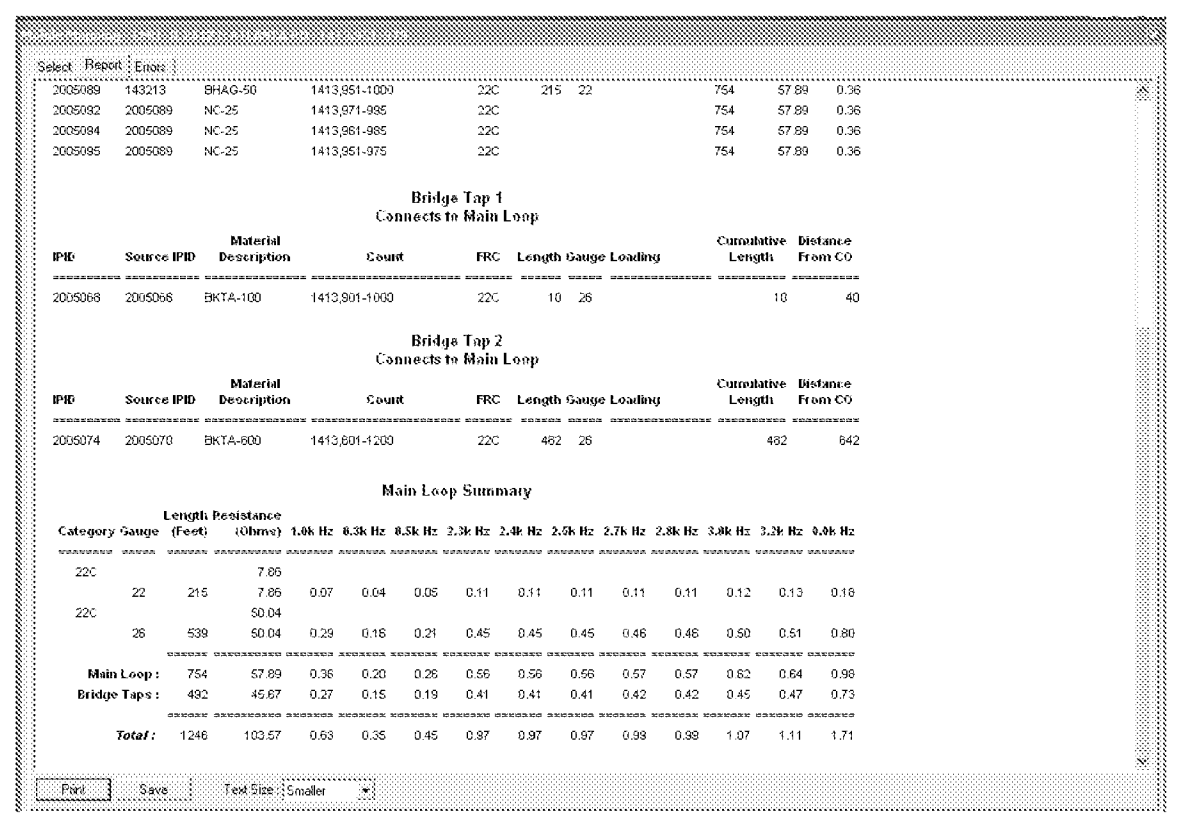

The graphical paths 348 and 350 are much easier to use and visualize than conventional reporting methods. Today, conventional loop make up reports are presented as columnar listings of facilities. FIGS. 16 and 17, for example, are screen shots illustrating prior art loop make-up reports. These prior art, conventional loop make up reports list the items that are connected to one another. These loop make-up reports help predict the capacity of that item to support certain services. Loop make-up reports may also be used to help locate network problems. As the reader may realize, the color-coded, graphical paths 348 and 350 (illustrated in FIGS. 14 and 15) are much easier to use than conventional reporting methods.

Figure 18:
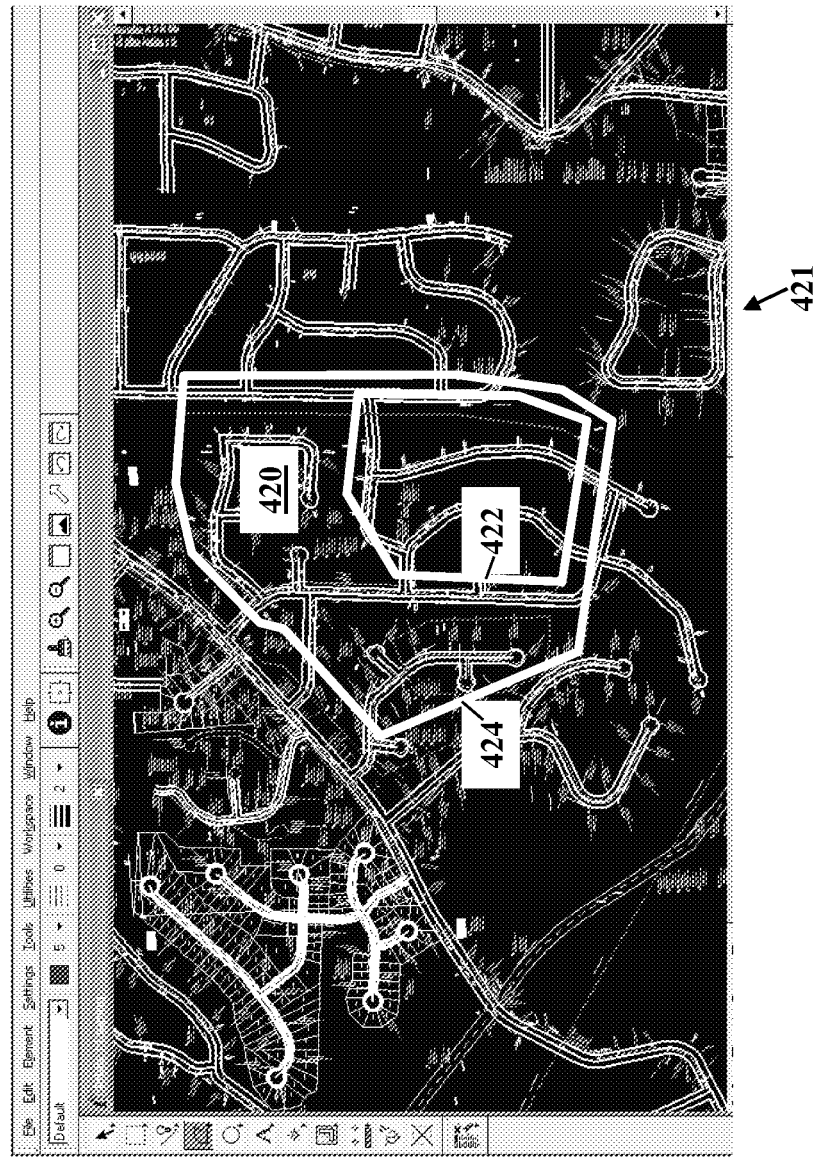
Figure 19:
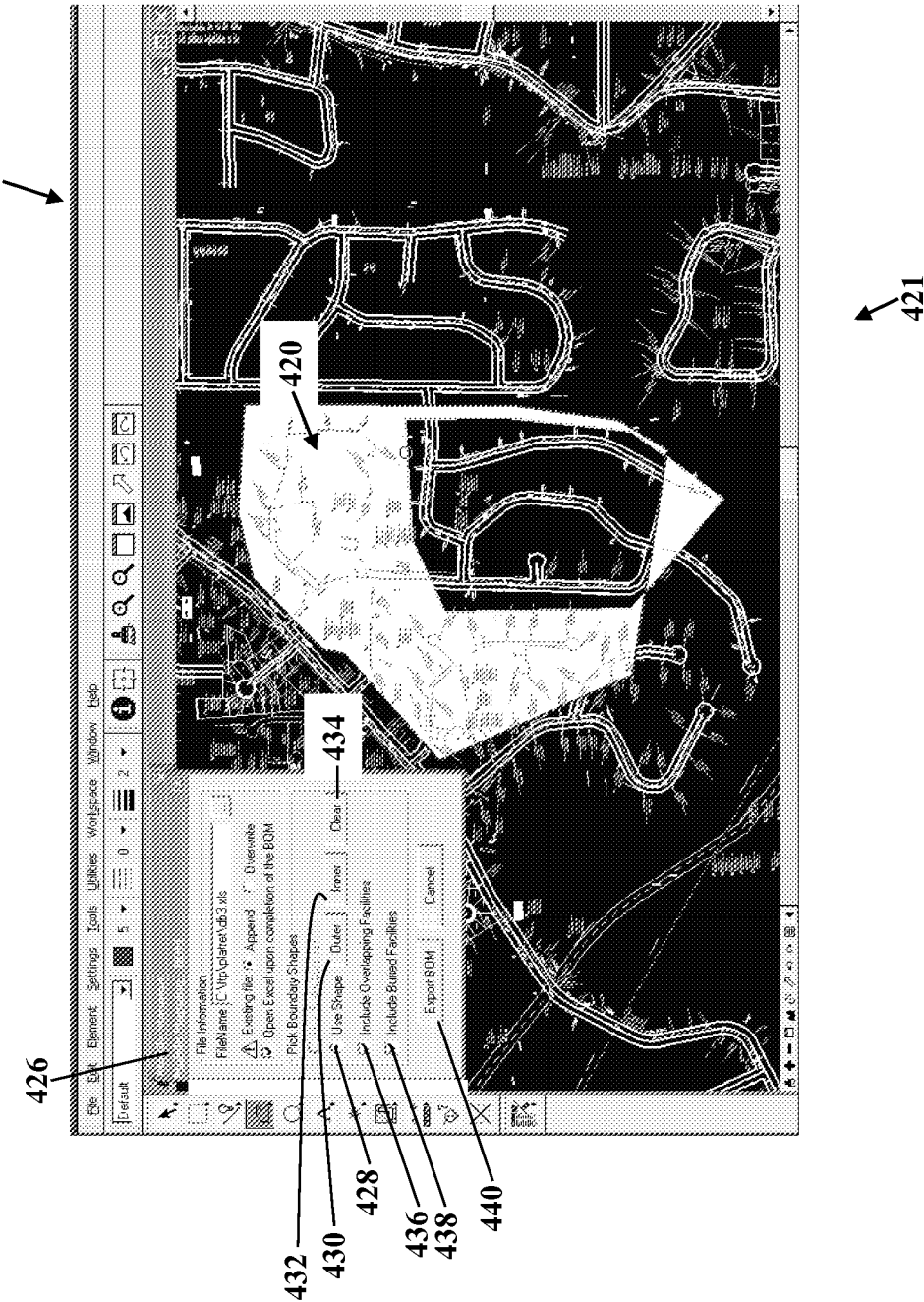
Figure 20:
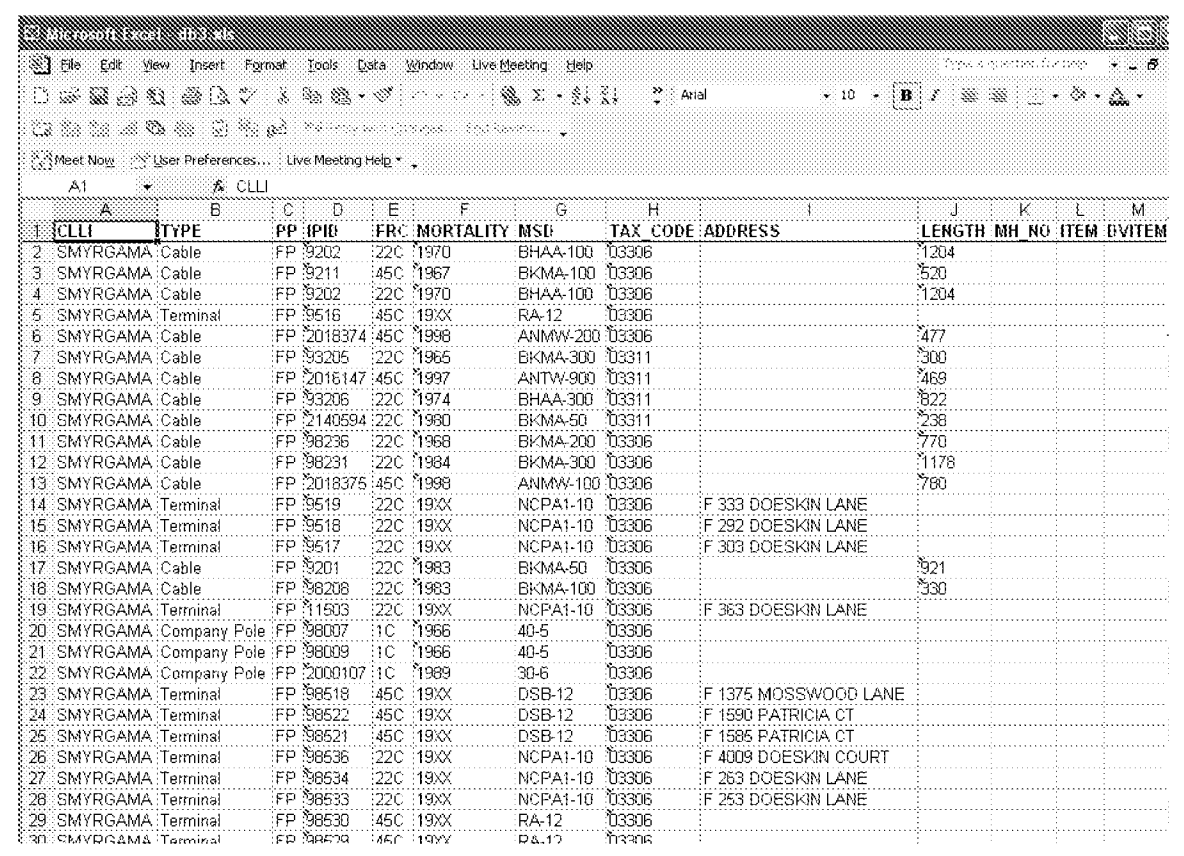
Figure 21:
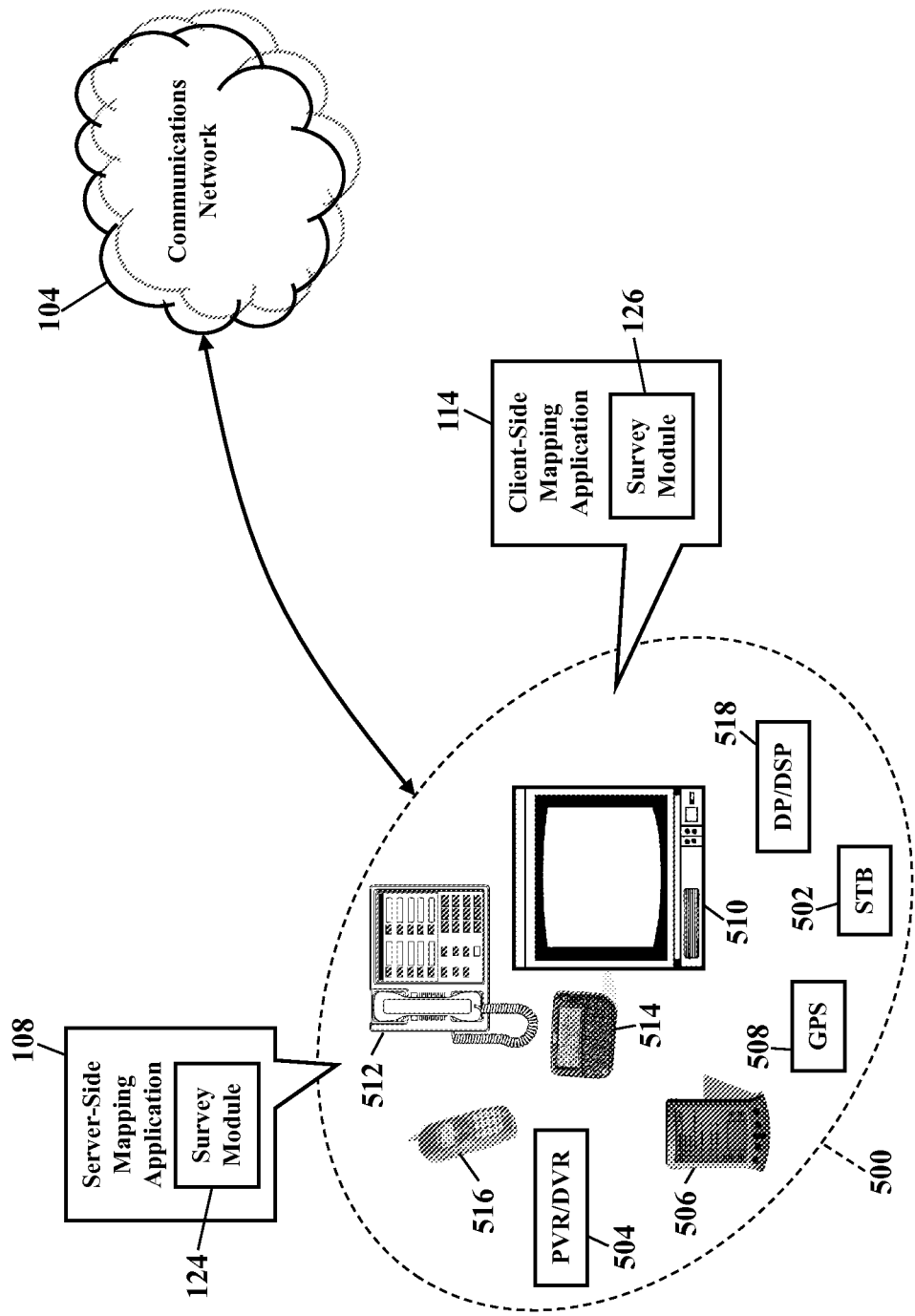
FIG. 21 depicts other possible operating environments for additional aspects of the exemplary embodiments.
Figure 22:
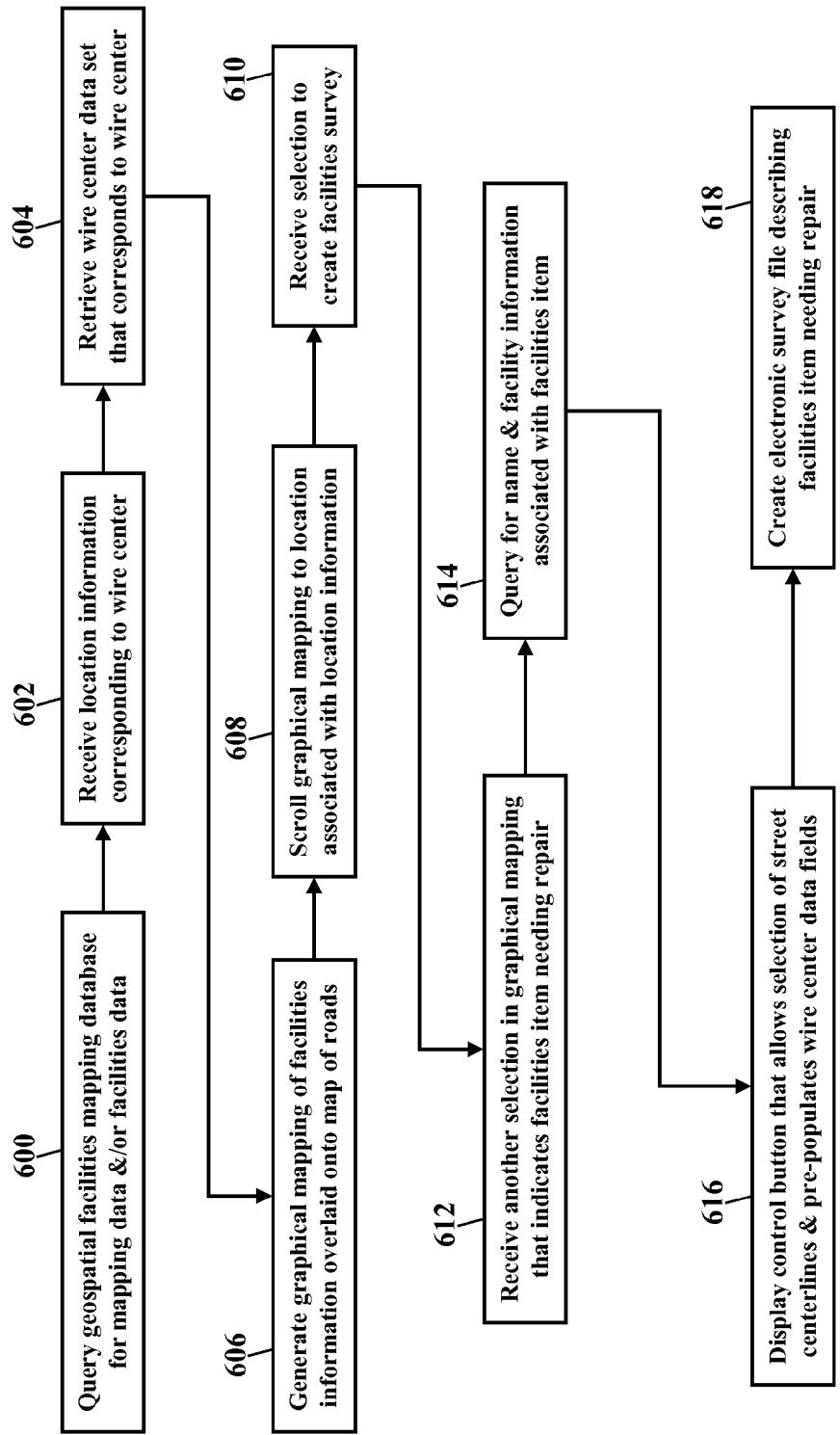
FIG. 22 is a flowchart illustrating a method of mapping facilities data, according to even more exemplary embodiments.

FIGS. 18-20 are screenshots illustrating capabilities for generating a geographic-specific bill of materials, according to more exemplary embodiments. Here the user may graphically define a geographic area 420, and exemplary embodiments generate a bill of materials for the geographic area 420. As FIG. 18 illustrates, the graphical user interface 120 produces a detailed graphical map 421 of roads. The user then draws or traces the geographic area 420. The user, for example, may use an input device (such as a mouse, pointer, or touch screen display) to draw the geographic area 420. The user may even define one or multiple inner and outer boundaries, such as by drawing an inner perimeter 422 and an outer perimeter 424. The geographic area 420, the inner perimeter 422, and the outer perimeter 424 are preferably closed figures (yet they may have open, undefined perimeter sections) of any shape (e.g., circular, polygonal, oval, ellipsoid). Here, then, when exemplary embodiments generate a bill of materials for the geographic area 420, exemplary embodiments may exclude the region or area defined by the inner perimeter 422. Suppose, for example, a flood occurs and the user needs to determine the impacted facilities. The outer perimeter 424 may define the flooded region, yet the inner perimeter 422 may define a region of higher ground where damage is less likely to occur. Exemplary embodiments may then determine the impacted facilities and, yet, exclude the facilities associated with the higher ground.

FIG. 19 illustrates the resultant geographic area 420. Here, also, exemplary embodiments may produce a "BOM" (or "Bill of Materials") dialog box 426. The BOM dialog box 426 may include a selectable option 428 for using defined boundary shapes. An outer control button 430 allows the user to define the outer perimeter 424, and an inner control button 432 allows the user to define the inner perimeter 422. A clear control button 434 allows the user to delete, remove, and/or redefine the inner and outer perimeters 422 and 424. When the bill of materials is generated for the geographic area 420, another selectable option 436 includes (or excludes) any overlapping facilities. Still another selectable option 438 includes (or excludes) buried facilities. When the user has defined the geographic area 420, the user selects an Export BOM control button 440 to generate the bill of materials. FIG. 20 illustrates the outputted bill of materials.

FIG. 13 depicts other possible operating environments for additional aspects of the exemplary embodiments. FIG. 13 illustrates that the client-side survey module 126 and/or the server-side survey module 124 may alternatively or additionally operate within various other devices 500. FIG. 13, for example, illustrates that the client-side survey module 126 and/or the server-side survey module 124 may entirely or partially operate within a set-top box (502), a personal/digital video recorder (PVR/DVR) 504, personal digital assistant (PDA) 506, a Global Positioning System (GPS) device 508, an interactive television 510, a video-capable (e.g., Apple's iPhone™) phone 512, a pager 514, a cellular/satellite phone 516, or any computer system and/or communications device utilizing a digital processor and/or a digital signal processor (DP/DSP) 518. The device 500 may also include watches, radios, vehicle electronics, clocks, printers, gateways, and other apparatuses and systems. Because the architecture and operating principles of the various devices 500 are well known, the hardware and software componentry of the various devices 500 are not further shown and described. If, however, the reader desires more details, the reader is invited to consult the following sources: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

FIG. 14 is a flowchart illustrating a method of mapping facilities data, according to even more exemplary embodiments. A geospatial facilities mapping database may be queried for mapping data and/or facilities data (Block 600). A selection of location information may be received that corresponds to a wire center (Block 602). A wire center data set, corresponding to the location information, is retrieved (Block 604). A graphical mapping of facilities information, overlaid onto a map of roads, is generated and displayed (Block 606). The graphical mapping may be scrolled to a location associated with the location information (Block 608). A selection is received to create a survey of facilities (Block 610). Another selection is received in the graphical mapping that indicates a facilities item needing repair (Block 612). A query is made for a name and facility information associated with the facilities item needing repair (Block 614). A control button may be displayed that, when selected, allows a user to select street centerlines and pre-populates wire center data fields that correspond to the street centerlines (Block 616). An electronic survey file is created that describes the facilities item needing repair (Block 618).

Exemplary embodiments may be physically embodied on or in a computer-readable media. This computer-readable media may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable media may be distributed to end-subscribers, licensees, and assignees. These types of computer-readable media, and other types not mention here but considered within the scope of the exemplary embodiments. A computer program product comprises processor-executable instructions for mapping facilities data.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
generating and causing display of a graphical mapping of facilities information overlaid onto a map of roads as a graphical user interface;
defining an outer perimeter of a geographic area in the graphical user interface;
displaying the outer perimeter in the graphical user interface;
receiving a selection of a facility displayed in the graphical user interface;
generating loop make-up information for the facility;
graphically displaying the loop make-up information as a path overlaid onto the map of roads in the graphical user interface;
emphasizing the path in the graphical user interface for ease of reference;
generating a bill of materials that corresponds to the outer perimeter;
outputting the bill of materials;
receiving a second selection in the graphical user interface to create a survey of facilities;
receiving a third selection in the graphical user interface of a facilities item needing repair;
associating an action to the facilities item needing repair; and
creating an electronic survey file that describes the facilities item needing repair.

2. The method of claim 1, further comprising associating a priority of repair to the facilities item.

3. The method of claim 1, further comprising associating a surveyor's name to the survey of facilities.

4. The method of claim 1, further comprising associating a survey identification number to the survey of facilities.

5. The method of claim 1, further comprising associating a storm name to the survey of facilities.

6. The method of claim 1, further comprising associating a Common Language Location Identifier (CLLI) code, a plat number, and an allocation area to the survey of facilities.

7. The method of claim 1, further comprising receiving a department selection in the graphical user interface of a department responsible for the facilities item needing repair.

8. The method of claim 1, further comprising electronically annotating the facilities item needing repair.

9. The method of claim 8, further comprising causing display of the electronic annotation in the graphical user interface graphical mapping.

10. The method of claim 1, further comprising causing display of the bill of materials in the graphical user interface.

11. The method of claim 10, further comprising causing display of a type of facilities associated with the facilities item needing repair.

12. The method of claim 11, further comprising causing display of an Internet Protocol Identification (IPID) number associated with the facilities item needing repair.

13. The method of claim 1, further comprising querying a geospatial facilities mapping database.

14. The method of claim 1, further comprising retrieving location information that corresponds to a wire center.

15. The method of claim 14, further comprising querying for a name and facility information associated with the facilities item needing repair.

16. The method of claim 15, further comprising scrolling the graphical user interface to a location associated with the location information.

17. The method of claim 1, further comprising causing display of a control button in the graphical user interface that, when selected, allows a user to select street centerlines and pre-populates wire center data fields that correspond to the street centerlines.

18. The method of claim 1, further comprising receiving a tree trimming selection in the graphical user interface that indicates a tree trimming crew is desired.

19. A system, comprising:
   a processor; and
   memory for storing code that when executed causes the processor to perform operations, the operations comprising:
     generating and causing display of a graphical mapping of facilities information overlaid onto a map of roads as a graphical user interface;
     defining an outer perimeter of a geographic area in the graphical user interface;
     displaying the outer perimeter in the graphical user interface;
     receiving a selection of a facility displayed in the graphical user interface;
     generating loop make-up information for the facility;
     graphically displaying the loop make-up information as a path overlaid onto the map of roads in the graphical user interface;
     emphasizing the path in the graphical user interface for ease of reference;
     generating a bill of materials that corresponds to the outer perimeter;
     outputting the bill of materials;
     displaying a count finder dialog box in the graphical user interface;
     receiving a first selection in the graphical user interface of a cable name from a menu of cable identifiers;
     querying for a cable count associated with the cable name;
     causing display of a listing of candidates in the graphical user interface associated with the cable count;
     displaying a listing of cable candidate identifiers in the graphical user interface, each entry in the listing of cable candidate identifiers further identifying candidate cables;
     receiving a second selection of a cable candidate identifier in the listing of cable candidate identifiers;
     highlighting the cable candidate identifier in the graphical user interface;
     generating another bill of materials that corresponds to the cable candidate identifier;
     receiving a third selection in the graphical user interface to create a survey of facilities;
     receiving a fourth selection in the graphical user interface of a facilities item needing repair;
     associating an action to the facilities item needing repair; and
     creating an electronic survey file that describes the facilities item needing repair.

20. A computer readable memory storing instructions that when executed cause a processor to perform operations, the operations comprising:
   generating and causing display of a graphical mapping of facilities information overlaid onto a map of roads as a graphical user interface;
   defining an outer perimeter of a geographic area in the graphical user interface;
   displaying the outer perimeter in the graphical user interface;
   receiving a selection of a facility displayed in the graphical user interface;
   generating loop make-up information for the facility;
   graphically displaying the loop make-up information as a path overlaid onto the map of roads in the graphical user interface;
   emphasizing the path in the graphical user interface for ease of reference;
   generating a bill of materials that corresponds to the outer perimeter;
   outputting the bill of materials;
   displaying a count finder dialog box in the graphical user interface;
   receiving a first selection in the graphical user interface of a cable name from a menu of cable identifiers;
   querying for a cable count associated with the cable name;
   causing display of a listing of candidates in the graphical user interface associated with the cable count;
   displaying a listing of cable candidate identifiers in the graphical user interface, each entry in the listing of cable candidate identifiers further identifying candidate cables;
   receiving a second selection of a cable candidate identifier in the listing of cable candidate identifiers;
   highlighting the cable candidate identifier in the graphical user interface;
   generating another bill of materials that corresponds to the cable candidate identifier;
   receiving a third selection in the graphical user interface to create a survey of facilities;
   receiving a fourth selection in the graphical user interface of a facilities item needing repair;
   associating an action to the facilities item needing repair; and
   creating an electronic survey file that describes the facilities item needing repair.

\* \* \* \* \*